Feb. 17, 1970   A. R. HINGORANY ET AL   3,496,336
ELECTRIC HEATER
Filed Oct. 25, 1967   3 Sheets-Sheet 1
FIG.1.
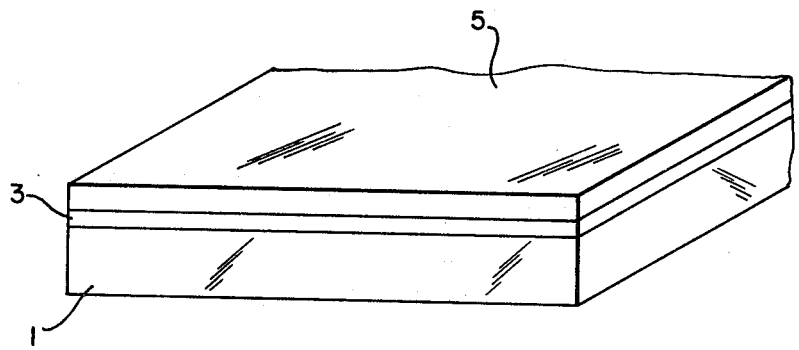
FIG.2.
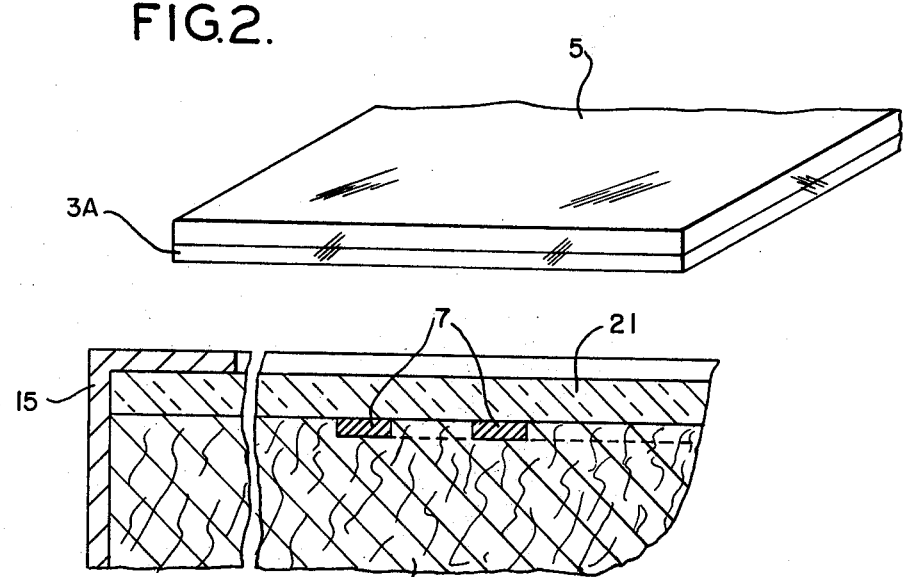
FIG.8.
Ashok R. Hingorany,
Joseph A. Willoughby,
Inventors.
Koenig, Senniger,
Powers and Leavitt
Attorneys Feb. 17, 1970    A. R. HINGORANY ET AL    3,496,336
ELECTRIC HEATER
Filed Oct. 25, 1967    3 Sheets-Sheet 2
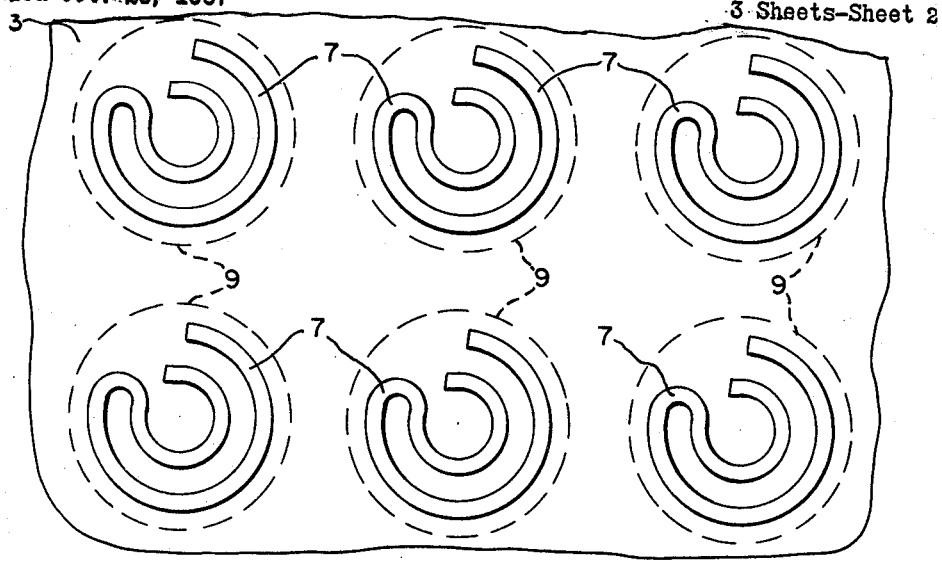
FIG.3.
FIG.4.
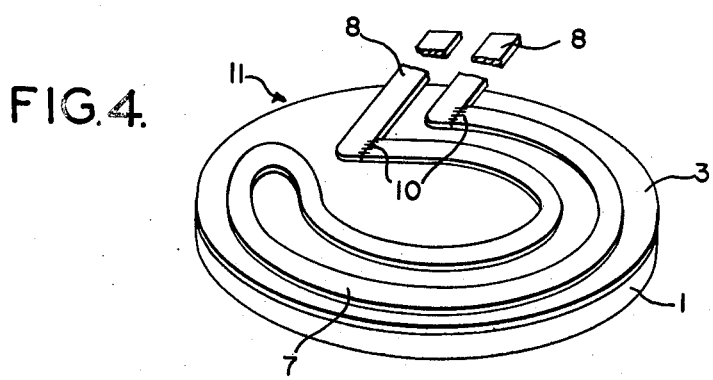
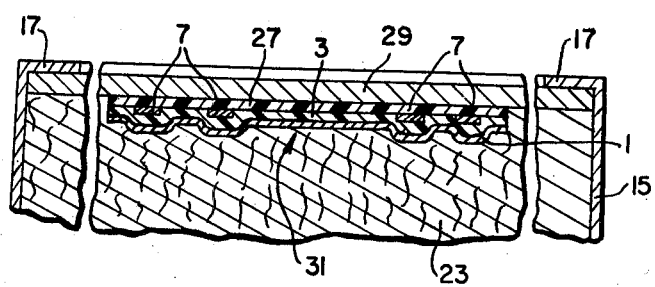
FIG. 9

Feb. 17, 1970  A. R. HINGORANY ET AL  3,496,336
ELECTRIC HEATER
Filed Oct. 25, 1967  3 Sheets-Sheet 3

United States Patent Office 3,496,336
Patented Feb. 17, 1970

3,496,336
ELECTRIC HEATER
Ashok R. Hingorany, Pawtucket, R.I., and Joseph A. Willoughby, Attleboro, Mass., assignors to Texas Instruments Incorporated, Dallas, Tex., a corporation of Delaware
Filed Oct. 25, 1967, Ser. No. 678,054
Int. Cl. H05b 3/68, 3/06, 3/16
U.S. Cl. 219—464                                    6 Claims

ABSTRACT OF THE DISCLOSURE

A thin three-layer bonded composite of thin layers of backing metal, insulation and electrical-resistance-heating metal or a thin two-layer composite of only the insulation and resistance-heating metal, have in each case the layer of resistance-heating metal etched to form individual designs of heaters or groups of heaters. In the case of grouped heaters, the composite may then be blanked out or otherwise divided to provide individual heaters or smaller groups thereof in composite sheet form.

---

A container of box form is provided to make a counter top range top or the like wherein a glass-ceramic layer has an upper surface presented for the placement of items such as cookware to be heated. One or more of the above-mentioned composites is located with the heating element in contact against the bottom or inside of the glass-ceramic layer. Connections are made with suitable circuitry and are provided in or in association with the box. The composite is held against the glass by compressed insulating fiberglass. In the case of the three layer composite the insulating layer has a component which will not melt or evaporate at high temperatures even above the usual heating temperatures at which the heater is designed to operate. In the case of the two layer composites the insulating layer is formed of a material which may or may not melt or evaporate under normal heating temperatures. If this layer is chosen to melt or evaporate it is absorbed by the fiberglass so as to free the resistance elements of the same.

Whille the invention is particularly useful to make heaters useful as table or countertop ranges, plate heaters and the like, it has other analogous uses.

It has been proposed to construct apparatus of this class by providing a flat sheet of a glass ceramic as a surface upon which to place items to be heated. An assembly of such a glass ceramic is one known as Pyroceram made by the Corning Glasss Works of Corning, N.Y. It has been proposed to place electrical heater circuits beneath the glass ceramic in juxtaposition thereto and to obtain as close positioning of such circuits as possible so as to obtain good heat transmission to the glass ceramic and to localize the heat transmitted through the glass ceramic from each heater circuit. This is to provide for individually controllable heating areas on the smooth upper surface of the glass ceramic.

The present invention by means of a low-cost construction provides for close overall engagement between substantially the entire areas of heaters and the bottom of the glass ceramic, thus providing a maximum of heat transfer. This is accomplished by providing a very thin form of an electrical heating element on an insulating layer which may or may not be backed by a flat metallic sheet. When not backed the insulating layer may be of the type which, after assembly under the glass ceramic, will, upon initial heating, disengage itself from the heater element, the purpose of which is to keep constant the heat output of the heating element. Other objects and features will be in part apparent and in part pointed out hereinafter.

Referring to the drawings,

FIG. 1 is a view illustrating one form of starting material from which heaters are made;

FIG. 2 is a view illustrating another form of such material;

FIG. 3 is a plan view of either of the FIG. 1 or FIG. 2 forms illustrating certain procedures for converting the starting materials of FIGS. 1 and 2 into heaters;

FIG. 4 is a view illustrating one form of heater obtained from the starting material of FIG. 1;

FIG. 8 is an enlarged view of a portion of FIG. 7 illustrating certain operating conditions for the FIG. 5 form of heater, and FIG. 9 is a cross section similar to FIG. 6 illustrating an alternate embodiment of the electrical heater of this invention.

Corresponding reference characters indicate corresponding parts throughout the several views of the drawings. Since certain parts are very thin and for clarity of illustration the drawings are not made to a constant scale.

Figure 5:
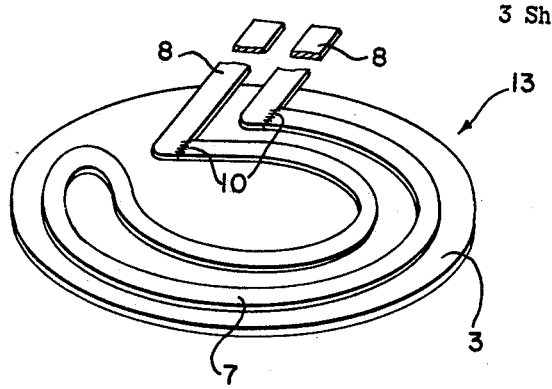
FIG. 5 is a view illustrating another form of heater obtained from the starting material of FIG. 2.

Referring to FIG. 1, at numeral 1 is indicated a metal backing sheet. Any appropriate metal may be used such as steel, copper or aluminum. The latter is preferable because of noncorrosion under ordinary conditions of use. An appropriate range of thicknesses for layer 1 is from twenty through fifty mils with about twenty-five mils preferred but this is not to be taken as limiting.

At numeral 3 is shown a layer of insulating polymer material which may be Teflon-coated Kapton. An appropriate range of thicknesses of the Kapton is one through six mils with two mils preferred. The range of thicknesses for the Teflon coating is one-half mil through one mil. Teflon is a fluorocarbon and Kapton is a polyimide both being trade names of the E. I. du Pont de Nemours Co. The Teflon is a good thermosetting bonding agent when placed under pressure at a comparatively low heating temperature, for example, 500° F. or more. The Kapton does not melt or char even at extremely high temperatures beyond those produced by the heaters to be formed. Kapton also has high electric and tensile strengths.

At numeral 5 is shown a layer of a conductive resistance-heating material such as Nichrome, Hoskins 750 alloy or Hoskins 875 alloy. An appropriate range of thicknesses is five-tenths through twelve mils with eight-tenths preferred for a conventional range top. The layers 1, 3, 5 in strip or other appropriate form are bonded under pressure at a temperature above the melting point of the Teflon thus to form a good bond between the three layers which become the starting material as indicated in FIG. 1. Thus the layer 1 carries the layers 5 bonded thereto.

In the FIG. 2 form of starting material, the layer 5 is retained. The layer 3A is like layer 3 in FIG. 1, except that in some cases its substance is that of a comparatively low melting point thermoplastic and evaporative polymer, such as Surlyn, which is an isonomer made by the said du Pont Co. Layer 3A is to function as a carrier layer. Its range of thickness is from one through six mils.

In FIG. 3 is shown how a composite either of the form of FIG. 1 or FIG. 2 is treated to convert the resistance-heating layer 5 into individual heater shapes. In FIG. 3 these are all shown as being of the same outline but they may be different. The shapes are produced by known silk-screen or photographic resist printing techniques. An etch-resist pattern is placed on the layer 5 and then etched in known manner. This removes all of the layer 5 outside of the etch-resist patterns to leave heaters of any desired appropriate shape as shown at numeral 7 in FIG. 3. Then the composite may be punched out as illustrated by the dotted lines 9 to provide a heater such as shown at 11 in FIG. 4 (produced from the FIG. 1 composite); or a heater 13 such as shown in FIG. 5 (produced from the FIG. 2 composite). In either case, flat conductive terminal tabs 8 are welded to the ends of the heater elements 7, as shown at 10. These are for cutting to the right length and connection with power circuitry.

It will be understood that if desired instead of blanking out individual heating elements as illustrated in FIG. 3, that several may be included in one blank for insertion as an assembly against the glass ceramic 21.

Figure 6:
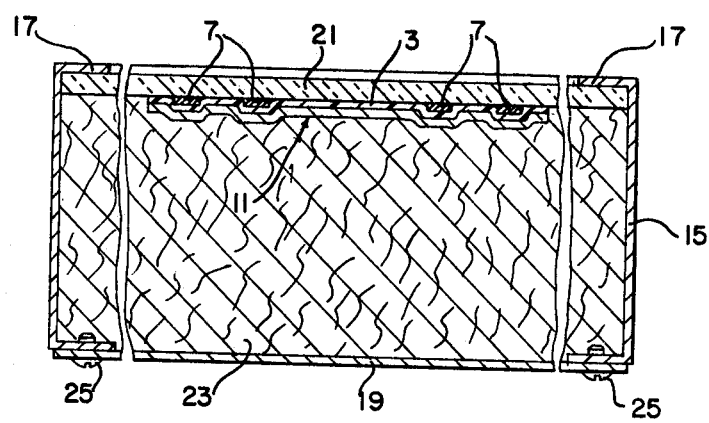
FIG. 6 is a cross section of a typical counter or range top employing a heater such as shown in FIG. 4.

In FIG. 6 is shown how the heater of FIG. 4 may be employed. This shows a counter top formed by a box 15 flanged at 17. It will be understood that the box contains suitable control circuitry (not shown) for making connections with the tabs 8. At 19 is shown a removable bottom. The box 15 when empty and the bottom 19 removed is turned over (flanges 17 down). A sheet of appropriate thickness of the glass ceramic 21 is inserted into position flatly engaging the flanges 17. Next, appropriate terminals of the control circuits are appropriately attached to a number of the heaters such as 11 to be used in the box. Then the connected heater assemblies such as shown in FIG. 4 are placed in proper position on the glass 21 with the resistance heater pattern 7 against the glass. Then a heat-resistance material such as fiberglass 23 or the like is pushed into the box 15 under pressure and the bottom 19 attached (see screws 25). The entire counter top may then be turned over for installation as such. Cooking utensils to be heated are placed on the top surface of the glass ceramic 21. The compression applied to the glass ceramic by the bottom 19 holds the assembly 11 in position against the glass ceramic 21.

Figure 7:
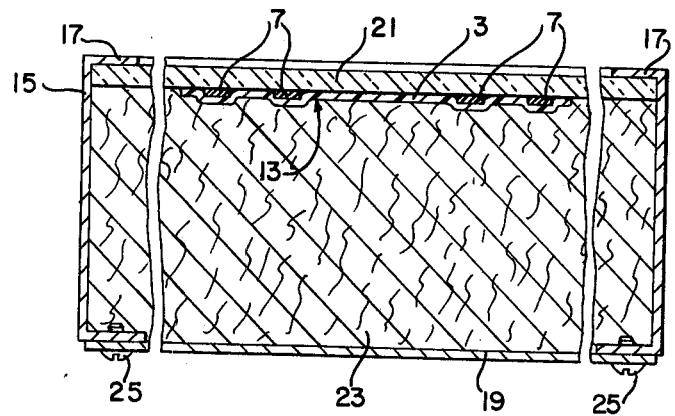
FIG. 7 is a view similar to FIG. 6 showing a counter or range top employing the heater illustrated in FIG. 5.

In FIG. 7 like numerals designate like parts to those employed in FIG. 6, except that in this case a heater assembly 13 such as shown in FIG. 5 is pushed against the glass ceramic 21. By exciting the heating element 7 to a temperature above the melting point of the Surlyn layer 3, this layer will melt and/or evaporate and will be absorbed by the fiberglass 23. As absorption occurs, the compressed fiberglass 23 pushes itself into position all around the strip 7 as indicated in FIG. 8. This frees the resistance material 17 from any decalibrating effect that any attached Surlyn might have. In some cases, however, a non-melting and non-evaporating material may be used for layer 3 in an arrangement 31 such as shown in FIG. 7 or in a four-layer arrangement comprising that of FIG. 4 with a polymeric top layer 27 bonded to the upper surfaces of 3 and 7 as illustrated in FIG. 9. The four-layer form of FIG. 9 is preferable for application to wall heating panels 29, instrument heating panels and the like which unlike the glass ceramic plate element 21 require insulation between them and the conductive heater material 7.

The advantages of the invention will be clear from the above. In both forms an overall close engagement is obtained between the entire areas of the thin heater elements 7 and the heat-receiving bottom of the glass ceramic 21. While the exaggerated sectioned layer thicknesses in the drawings do not show this, it will be appreciated from the thickness ranges above given.

In both forms of the invention the thin heating elements 7 are (before assembly as in FIGS. 6–8) initially carried upon and bonded to at least one continuous sheet 3A (FIG. 2) or the bonded sheets 3, 1 (FIG. 1). Thus there is avoided the almost impossible task of maintaining the flatness of such a heating element when not supported upon some kind of sheet preliminarily to applying the resistances 7 to the glass ceramic 21.

An advantage of the form of the invention shown in FIG. 4 is that the metal backing 1 tends to minimize breakdown of a resistance element 7 at any thin point caused by the effects of manufacturing tolerances.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An electrical heater comprising a rigid plate element having a first surface for supporting items to be heated and an opposite surface, a heating element embodying at least a thin, flexible, electrical resistance member bonded to one surface of a thin, flexible, electrically insulating carrier layer, a mass of resilient, heat-resistant electrically insulating material, and a frame engaging said rigid plate element and said resilient material, said frame cooperating with said rigid plate element for enclosing said resilient material, said frame comprising said resilient materal against said heating element and rigid plate element for holding said flexible electrical resistance member in heat-transfer engagement with said opposite surface of the rigid element in electrically insulated relation to said first surface of said rigid plate element.

2. An electrical heater as set forth in claim 1 wherein said heating element further embodies a thin, flexible metal backing layer bonded to said carrier layer oppositely of said electrical resistance member.

3. An electrical heater as set forth in claim 1 wherein said carrier layer of said heating element embodies material evaporable in response to heating of said resistance member by the passage of electrical current therethrough, and wherein said resilient material bears against said heating element to hold said resistance member in said heat-transfer relation to said rigid plate element following evaporation of said carrier layer.

4. An electrical heater as set forth in claim 3 wherein said resilient material comprises fiberglass.

5. An electrical heater as set forth in claim 1 wherein said rigid plate element embodies a glass-ceramic material.

6. An electrical heater as set forth in claim 1 wherein said rigid plate element is formed of electrically conductive material, and wherein said heating element embodies an additional thin layer of electrically insulating material bonded to said electrical resistance member oppositely of said carrier layer to be disposed between said electrical resistance member and said opposite surface of said rigid plate element.

References Cited

UNITED STATES PATENTS

| | | | |
|---|---|---|---|
| 1,521,241 | 12/1924 | Hale | 338—212 X |
| 2,463,260 | 3/1949 | Glynn | 219—543 X |
| 2,745,942 | 5/1956 | Cohen | 219—528 |
| 3,043,943 | 7/1962 | Moot | 219—449 |
| 3,060,300 | 10/1962 | Horner | 219—345 |
| 3,136,680 | 6/1964 | Hochberg | 161—189 |
| 3,215,574 | 11/1965 | Korb | 156—3 |
| 3,231,718 | 1/1966 | Vasile | 219—465 |
| 3,265,865 | 8/1966 | Hager | 219—549 |
| 3,266,661 | 8/1966 | Dates | 219—438 X |
| 3,401,369 | 9/1968 | Palmateer et al. | 339—17 |

VOLODYMYR Y. MAYEWSKY, Primary Examiner

U.S. Cl. X.R.

219—467, 345, 521, 543, 544, 547; 156—3